United States Patent [19]
Miramontes Cardenas et al.

[11] Patent Number: 5,534,475
[45] Date of Patent: Jul. 9, 1996

[54] CATALYTICALLY ACTIVE CERAMIC MONOLITHS FOR THE REDUCTION OF LEADED GASOLINE FUELED ENGINE POLLUTANTS AND THE PRODUCTION THEREOF

[75] Inventors: Luis E. Miramontes Cardenas; Salavador Castillo Cervantes; Florencia M. Moran Pineda, all of Mexico City, Mexico

[73] Assignee: Instituto Mexicano Del Petroleo, Mexico

[21] Appl. No.: 204,567

[22] Filed: Mar. 2, 1994

[51] Int. Cl.$^6$ .............................. B01J 21/04; B01J 23/10; B01J 23/26; B01J 23/72
[52] U.S. Cl. ........................ 502/304; 502/314; 502/315; 502/318; 502/370; 502/323; 502/331; 502/337; 502/346; 502/439; 502/527; 423/213.2; 423/213.5
[58] Field of Search ................................ 502/315, 318, 502/320, 337, 346, 314, 323, 331, 439, 527; 423/213.2, 213.5

[56] References Cited

U.S. PATENT DOCUMENTS

| | | | |
|---|---|---|---|
| 3,993,572 | 11/1976 | Hindin et al. | 502/302 |
| 4,199,477 | 4/1980 | Hegedus . | |
| 4,208,454 | 6/1980 | Reed et al. . | |
| 4,539,311 | 9/1985 | Harrison et al. | 502/304 |
| 4,960,574 | 10/1990 | Bricker . | |
| 5,106,802 | 4/1992 | Horiuchi et al. | 502/302 |
| 5,242,883 | 9/1993 | Ichikawa et al. | 502/439 |

FOREIGN PATENT DOCUMENTS

| | | |
|---|---|---|
| 62-241552 | 10/1987 | Japan . |
| 62-266142 | 11/1987 | Japan . |
| 63-107751 | 5/1988 | Japan . |

OTHER PUBLICATIONS

Thomas, W. John "The Catalytic Monolith." *Chemistry and Ind. (Lond)*, N. 9 315–319 (May 4, 1987).
"Cell Design for Ceramic Monoliths for Catalytic Converter Application", Gulati, SAE Int. Fuel Lubr. Meet. (Portland, OR Oct. 10—13, 1988 Pap. No. 881685 9P). (1988).
Centi et al. "Role of the Nature of Copper Sites in the Activity of Copper–Based Catalysts for No Conversion." *Research on Chemical Intermediates*, vol. 17, (1992) pp. 125–135.
Fu et al. "A Low–Temperature IR Spectroscopic Study of Selective Adsorption of NO and CO on CuO/y–Al$_2$O$_3$." *Journal of Catalysis*, vol. 132, (1991) pp. 84–91.
Nunan et al. "Physicochemical Properties of Ce–Containing Three–Way Catalysts and the Effect of Ce on Catalyst Activity." *Journal of Catalysis*, vol. 133, (1992) pp. 308–325.
Larsson et al. "The Effect of the Chemical Nature of the Wash–Coat on the Catalytic Performance of CO Oxidation Catalysts of Monolith Type." *Catalysts and Automotive Pollution Control*, (1987), pp. 332–343.
Kubush et al. "High–Temperature Substrates and Washcoats for Auto Exhaust Emission Control." *Society of Automotive Engineers, Inc.*, (1987), pp. 1–11.
Irandoust et al. "Monolithic Catalysts for Nonautomobile Applications." *Catal. Rev.–Sci. Eng.*, vol. 30(3), (1988), pp. 341–392.
Williamson et al. "Performance of Copper Base Metal Catalysts in Stoichiometric Automotive Exhausts." *SAE Int. Fuel Lubr. Meet.* (Toronto Nov. 2–5, 1987) PAP. (ISSN 0148–7191) No. 872132 12, pp. 14.

*Primary Examiner*—Anthony McFarlane
*Attorney, Agent, or Firm*—Roylance, Abrams, Berdo & Goodman

[57] ABSTRACT

Catalytically active ceramic monoliths coated with gamma alumina and impregnated with chromium, copper and nickel are used in catalytic converters for reduction of pollutants resulting from exhaust gases produced by internal combustion engines fueled with leaded gasoline.

17 Claims, No Drawings

CATALYTICALLY ACTIVE CERAMIC MONOLITHS FOR THE REDUCTION OF LEADED GASOLINE FUELED ENGINE POLLUTANTS AND THE PRODUCTION THEREOF

FIELD OF THE INVENTION

The present invention relates to catalytically active ceramic monoliths of the honeycomb type, coated with gamma alumina on which are deposited metals of transition groups IB, VIB and VIII of the periodic table and to use of such catalyst in the oxidation and simultaneous reduction of pollutants present in the exhaust gases of leaded gasoline fueled internal combustion engines, and to the preparation of such catalysts.

More particularly, the present invention relates to catalytically active monoliths useful in the reduction of pollutants, such as hydrocarbons, carbon monoxide and nitrogen oxides, resulting from burning leaded gasoline.

BACKGROUND OF THE INVENTION

Currently, a great variety of catalytic converters is known, which catalytic converters are used to reduce emission of polluting gases derived from gasoline fueled internal combustion engines using lead-free or unleaded gasoline.

Catalytic converters use double bed and monolithic converter systems. Double bed systems are arranged in such a way that they have two zones of operation, where two types of catalytic material are located, in which reduction is conducted in the first section and oxidation in the second section. Monolithic converters may be oxidative, in which there is a need to add air to the system for its operation. Another type of this kind of converter is a three-way converter which is the latest and most effective, which operates without requiring additional air. The difference between these converters resides in their catalytic composition, since their internal structure is very similar.

Ceramic honeycomb catalytic converters are monolithic and contained in an exterior hollow body made of steel, generally stainless steel, which shape is similar to that of conventional exhaust pipes. In the converter is located a honeycomb shaped ceramic monolith with multiple and minute channels of diverse geometric and density of cells.

Such monoliths are fixedly located within a catalytic converter, which is installed in an automobile exhaust system in order to significantly reduce emission of such polluting gases.

Transition or noble metals have been used to impregnate ceramic supports covered with alumina, in order to obtain catalysts used for reducing emission of pollutants in gasoline engines. However, use of such catalysts have been restricted in use to only unleaded gasoline. Use of such catalysts with leaded gasoline causes the catalysts to become quickly inactivated. Thus, the operator is warned to use unleaded gasoline only. Accordingly, use of such catalysts with leaded gasoline is unpractical.

An object of the present invention is to provide a new process for the preparation of catalytically active ceramic monoliths useful for the reduction of pollutants derived from leaded gasoline-fueled internal combustion engines.

A further object of the invention is to provide a catalyst for reducing contaminating gases including hydrocarbons, carbon monoxide and nitrogen oxides.

Another object of the present invention is to provide a process for reducing emissions using a ceramic monolith catalyst.

Another object of the invention is to provide a ceramic monolith catalyst which can provide both high conversion in oxidation and reduction of pollutants.

SUMMARY OF THE INVENTION

The present invention comprises a process for the preparation of catalytically active ceramic monoliths, in which the monoliths are initially coated with gamma alumina alone or in combination with cerium oxide and then impregnated with catalytic amounts of chromium, copper and nickel. It has been discovered that the resulting catalyst may be used for the simultaneous oxidation and reduction of exhaust gases generated by leaded gasoline-fueled internal combustion engines. Surprisingly, the catalyst of the present invention does not become quickly deactivated as do prior catalytic converter systems upon contact with exhaust gases from engines using leaded gasoline as fuel. Additionally, it has been found that inclusion of cerium oxide in the gamma alumina base coat prior to impregnation of chromium, copper and nickel further increases catalytic activity.

DETAILED DESCRIPTION OF THE INVENTION

The present invention comprises a process of preparation of catalytically active honeycomb ceramic monoliths, for the simultaneous reduction of pollutants present in exhaust gases resulting from burning gasoline containing tetraethyl lead in internal combustion engines. Such exhaust gases contain pollutants including hydrocarbons, carbon monoxide and nitrogen oxides.

Any suitable ceramic monolithic substrate having a honeycomb structure may be used as a catalyst support. Such substrates are conventional. The monolith is preferably made of any suitable ceramic material, such as cordierite, which has a small range of thermal expansion and a high resistance to thermal shock. Such materials are conventional.

The honeycomb ceramic monolith may, for example, possess a density of cells varying from about 200 to about 400 cells per square inch, preferably from about 300 to about 400 cells per square inch. The cells are mainly of square and/or triangular geometric shapes in a honeycomb design.

The honeycomb ceramic monoliths of the present invention are coated with gamma alumina on which is deposited or impregnated the transition metals. Preferably, the process is carried out using a honeycomb ceramic monolith coated with the gamma alumina base in an amount in the range of from about 5 to about 20 weight percent, preferably from about 15 to about 20 weight percent, based on the total weight of the monolith.

Any suitable gamma alumina may be utilized for coating of the monolith. The gamma alumina may be used alone, or preferably, the gamma alumina is used in combination with from about 1 to about 10 weight percent, preferably from about 2 to about 5 weight percent cerium oxide. Gamma alumina and gamma alumina/cerium oxide-coated monoliths are available from Allied Signal, Inc. Environmental Catalysts. Preferred gamma alumina compositions are set forth in Table 1.

TABLE 1

|  | Support Type I | Support Type II |
| --- | --- | --- |
| Surface area, m²/g | 145–160 | 145–160 |
| Chemical composition, wt % | 95% gamma alumina 5% cerium oxide | 100% gamma alumina |

The gamma alumina-coated ceramic monolith is impregnated with a combination of chromium, copper and nickel. Deposit of the active metals of the present invention on the gamma alumina coated support is carried out by impregnating the honeycomb ceramic monolith coated with stabilized gamma alumina or gamma alumina/cerium oxide.

Thus, for example, impregnation is carried out with an aqueous salt solution containing chromium, copper and nickel, provided, for example, by a dihydrate of sodium or potassium dichromate, cupric chloride, and nickel nitrate hexahydrate, respectively. The gamma alumina coated monolith is preferably heated to a temperature in the range of from about 70° to about 100° C. prior to and/or during impregnation with the salt solution.

The aqueous salt solution used for impregnation may have any suitable amount of the metals so as to provide catalytic amounts thereof on the gamma alumina or gamma alumina/cerium oxide base. Preferably, the aqueous salt solution comprises a chromium concentration from about 2 to about 6 weight percent; copper in a concentration from about 1 to about 3 weight percent and nickel varying from about 0.5 to about 2 weight percent concentration. When the impregnation of the gamma alumina coated monolith with such solution has been accomplished, preferably, the monolith will have the following composition of metals: from about 2 to about 5 weight percent, preferably 3 to about 5 weight percent chromium; from about 1 to about 3 weight percent, preferably about 2 to about 3 weight percent copper; and from about 0.5 to about 2 weight percent, preferably 1 to about 2 weight percent nickel.

Following impregnation, the catalyst is subjected to thermal treatment carried out in two steps: 1) drying carried out at a temperature of 70° to 100° C. for about 2 to about 6 hours, and 2) calcination at a temperature in the range of from about 200° to about 600° C. for about 2 to about 6 hours.

Chromium is preferably provided by a salt containing the same, preferably sodium dichromate dihydrate ($Na_2Cr_2O_7 \cdot 2H_2O$); copper by a salt, such as cupric chloride ($CuCl_2$) and the nickel by nickel nitrate hexahydrate [$Ni(NO_3)_2 \cdot 6H_2O$].

The coated monolith catalyst of the present invention is used to convert pollutants in the exhaust from leaded gasoline-fueled engines at temperatures, for example, in the range of from about 300° to about 500° C., without the deactivation of the catalyst experienced using prior catalytic monoliths with leaded fuels.

EXAMPLE 1

A honeycomb ceramic monolith coated with gamma alumina combined with cerium oxide in an amount of 15 to 20 weight percent based on the total weight of the monolith previously heated to temperatures in the range of 70° to 110° C., is impregnated with an aqueous solution containing a chromium concentration between 2 and 5 weight percent, a copper concentration between 1 and 3 weight percent and a nickel concentration between 0.5 and 2 weight percent, based on the total catalyst weight results in a catalytically active honeycomb ceramic monolith with the following metal composition: 4.5 weight percent chromium, 2.4 weight percent copper; and 1.0 weight percent nickel based on the total catalyst weight.

EXAMPLE 2

The monolith obtained in the Example 1 is subjected to a thermal treatment comprising the steps of: a) drying and b) calcination, carried out under the following conditions:

a) Temperature: between 70° and 100° C.

Time: between 2 and 6 hours b) Temperature: between 200° and 600° C.

Time: between 2 and 6 hours

EXAMPLE 3

Honeycomb ceramic monolith catalyst prepared according to the technique described in Example 2 is placed in a catalytic converter. An exhaustion gas stream resulting from a leaded gasoline engine, mainly comprising hydrocarbons (HC), carbon monoxide (CO) and nitrogen oxides ($NO_x$) at a temperature between 300° and 500° C., contacts the catalyst resulting in conversion to carbon dioxide, nitrogen and water ranging from 50 to 70% without suffering a significant loss of catalyst due to the entrainment in system as seen in Table 2, below.

TABLE 2

| Temperature | Average Percent Conversion | | |
| --- | --- | --- | --- |
| (°C.) | HC | CO | $NO_x$ |
| 300 | 50 | 50 | 4 |
| 400 | 55 | 60 | 12 |
| 500 | 62 | 70 | 18 |

EXAMPLE 4

A ceramic monolith of the honeycomb type coated with gamma alumina is heated to temperatures between 70° and 100° C. and impregnated with an aqueous salt solution comprising chromium in a concentration of 2 to 6 weight percent, copper in 1 to 3 weight percent and nickel in 0.5 to 2 weight percent, thus obtaining a catalytically active honeycomb type ceramic monolith having the following metallic composition: 4.5 weight percent chromium, 2.5 weight percent copper and 1.0 weight percent nickel.

EXAMPLE 5

The ceramic monolith prepared according to Example 4 is subjected to a thermal treatment comprising the steps of: a) drying, and b) calcination under the following conditions:

a) Temperature: between 70° and 100° C.

Time: between 2 and 6 hours b) Temperature: between 200° and 600° C.

Time: between 2 and 6 hours

EXAMPLE 6

The catalytic ceramic monoliths prepared according to Examples 4 and 5 are placed in a catalytic converter, and an exhaust gas stream from a leaded gasoline fueled engine, mainly constituted of hydrocarbons (HC), carbon monoxide (CO) and nitrogen oxides ($NO_x$) is passed through the catalytic converter at temperatures from 300° to 500°. Reaction takes place with a conversion to carbon dioxide ($CO_2$), nitrogen ($N_2$) and water in the range of 40 to 60% without significant loss of catalyst due to the entrainment in the system. The average conversion of contaminants at the operating conditions in the converter is show in Table 3.

TABLE 3

| Temperature | Average Percent Conversion | | |
|---|---|---|---|
| (°C.) | HC | CO | $NO_x$ |
| 300 | 35 | 49 | 3 |
| 400 | 40 | 60 | 9 |
| 500 | 38 | 52 | 15 |

Although the invention has bean described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification.

What is claimed is:

1. A process for the preparation of catalytically active ceramic monoliths for the reduction of pollutants derived from leaded gasoline fueled engines comprising the steps of impregnating a gamma alumina-cerium oxide base-coated honeycomb ceramic monolith with an aqueous solution comprising chromium, copper and nickel and subsequently heating the impregnated monolith.

2. The process of claim 1, ,wherein said honeycomb ceramic monolith coated with gamma alumina is heated to a temperature between about 70° and about 110° C. prior to impregnation.

3. The process of claim 1, wherein said impregnation solution is an aqueous solution having a chromium concentration between about 2 and about 6 weight percent; a copper concentration between about 1 and about 3 weight percent, and a nickel concentration between about 0.5 and about 2 weight percent.

4. The process of claim 1, wherein the impregnated catalyst is subjected to thermal treatment including a drying step and a calcinating step.

5. The process of claim 4, wherein said drying step is carried out at a temperature between about 70° and about 110° C., for a period from about 2 to about 6 hours.

6. The process of claim 5, wherein said calcination step is carried out at a temperature in the range of from about 200° to about 600° C. for a period from about 2 to about 6 hours.

7. A catalyst for conversion of exhaust gas pollutants comprising a gamma alumina-cerium oxide base-coated honeycomb ceramic monolithic substrate in which said gamma alumina is impregnated with chromium, copper and nickel.

8. The catalyst of claim 7, wherein said substrate contains from about 2 to about 5 weight percent chromium, from about 1 to about 3 weight percent copper, and from about 0.5 to about 2 weight percent nickel.

9. The catalyst of claim 8, wherein said substrate contains from about 3 to about 5 weight percent chromium, and from about 1 to about 2 weight percent nickel.

10. The catalyst of claim 8, wherein said gamma alumina base comprises cerium oxide.

11. The catalyst of claim 9, wherein said gamma alumina base comprises cerium oxide.

12. The catalyst of claim 7, wherein said cerium oxide is present in the amount of from about 1 to about 10 weight percent.

13. The catalyst of claim 12, wherein said cerium oxide is present in the amount of from about 2 to about 5 weight percent.

14. A catalyst for conversion of exhaust gas pollutants derived from lead gasoline fueled engines consisting essentially of a gamma alumina-cerium oxide base-coated honeycomb ceramic monolithic substrate impregnated with chromium, copper and nickel.

15. The catalyst prepared by the process of claim 1.

16. The process for the preparation of catalytically active ceramic monoliths for the reduction of pollutants resulting from leaded gasoline fueled engines comprising the steps of providing a gamma alumina base-coated honeycomb ceramic monolith;

impregnating said gamma alumina base-coated honeycomb ceramic monolith with an aqueous solution comprising an aqueous salt solution of chromium, copper and nickel salts;

drying said impregnated monolith at a temperature of about 70° to about 100° C.; and calcining said dried impregnated monolith at a temperature of from about 200° to about 600° C.

17. The process of claim 16, wherein said gamma alumina base comprises cerium oxide.

* * * * *